United States Patent
Duffy et al.

(10) Patent No.: US 12,064,707 B2
(45) Date of Patent: *Aug. 20, 2024

(54) INTERACTIVE DISPLAY WITH SPECIAL EFFECTS ASSEMBLY

(71) Applicant: Universal City Studios LLC, Universal City, CA (US)

(72) Inventors: Kaitlyn Marie Duffy, Orlando, FL (US); Mark James Traynor, Orlando, FL (US); Anthony Melo, Orlando, FL (US); Howard Bruce Mall, Winter Springs, FL (US); Yu Jen Lin, Orlando, FL (US); Nicholas Anthony Puglisi, Orlando, FL (US); Carin Harkins, Orlando, FL (US); Caitlin Berner, Orlando, FL (US); Samuel J. Knox, Orlando, FL (US); Shawn Wright, Orlando, FL (US); Suzanne Harris, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,818

(22) Filed: Feb. 7, 2023

(65) Prior Publication Data

US 2023/0182035 A1     Jun. 15, 2023

Related U.S. Application Data (63) Continuation of application No. 17/488,058, filed on Sep. 28, 2021, now Pat. No. 11,590,432.

(Continued)

(51) Int. Cl.
*A63J 5/02*         (2006.01)
*G02B 30/00*     (2020.01)
(Continued)

(52) U.S. Cl.
CPC ............... *A63J 5/02* (2013.01); *G02B 30/00* (2020.01); *G06F 3/016* (2013.01); *G09G 3/003* (2013.01);
(Continued)

(58) Field of Classification Search
None
See application file for complete search history.

(56) References Cited

U.S. PATENT DOCUMENTS 6,111,571 A * 8/2000 Summers .............. H04L 67/131
                                                                    709/224
6,190,019 B1    2/2001 Hess
(Continued)

FOREIGN PATENT DOCUMENTS

WO    2019001127 A1    1/2019

OTHER PUBLICATIONS

Stranger Things Pop-Up Experience—Halloween Horror Nights 2019—Universal Orlando Resort, uploaded October 3, ~019 by ThrillGeek, accessed Sep. 28, 2021, https://www_youtube_com/watch?app=desktop&v=N4c_7vgxEQA.

*Primary Examiner* — Patrick N Edouard
*Assistant Examiner* — Peijie Shen
(74) *Attorney, Agent, or Firm* — Fletcher Yoder P.C.

(57) ABSTRACT

A three-dimensional display system includes a first display and a second display spaced apart from the first display having one or more light sources configured to emit light and to illuminate the first display, where the first display is at least partially transparent such that the second display is visible through the first display. The three-dimensional display system includes a special effect system disposed at least in part between the first display and the second display and is configured to be activated to cause a special effect to be visible through the first display. The three-dimensional display system disposes (Continued)

play system includes a controller communicatively coupled to the first display, the second display, and the special effect system.

21 Claims, 4 Drawing Sheets

Related U.S. Application Data (60) Provisional application No. 63/085,275, filed on Sep. 30, 2020.

(51) Int. Cl.
*G06F 3/01* (2006.01)
*G09G 3/00* (2006.01)
*A63J 5/00* (2006.01)

(52) U.S. Cl.
CPC .......... *A63J 2005/003* (2013.01); *A63J 5/023* (2013.01); *A63J 5/025* (2013.01); *A63J 5/028* (2013.01); *G09G 2300/023* (2013.01); *G09G 2354/00* (2013.01)

(56) References Cited

U.S. PATENT DOCUMENTS

| | | | |
|---|---|---|---|
| 6,481,851 B1 | 11/2002 | McNelley et al. | |
| 6,906,762 B1 | 6/2005 | Witehira et al. | |
| 7,693,719 B2 | 4/2010 | Chu et al. | |
| 8,614,683 B2 * | 12/2013 | Ng | G06F 3/016 |
| | | | 345/110 |
| 8,624,797 B2 | 1/2014 | Lee et al. | |
| 8,758,144 B2 * | 6/2014 | Williams | G02F 1/133602 |
| | | | 463/46 |
| 8,894,498 B2 | 11/2014 | Edwards et al. | |
| 8,912,984 B2 * | 12/2014 | Prociw | G09G 3/3208 |
| | | | 345/82 |
| 8,976,323 B2 | 3/2015 | Smithwick et al. | |
| 9,202,171 B2 | 12/2015 | Kuhn | |
| 9,635,305 B1 * | 4/2017 | Streibig | G06F 3/017 |
| 9,661,316 B2 * | 5/2017 | Kim | G02F 1/1347 |
| 9,939,887 B2 | 4/2018 | Borke et al. | |
| 10,178,928 B2 * | 1/2019 | Ophardt | G06F 3/0482 |
| 10,255,729 B1 * | 4/2019 | Pulitzer | G06F 3/016 |
| 10,366,642 B2 | 7/2019 | Reichow et al. | |
| 10,474,103 B2 | 11/2019 | Holstine | |
| 10,628,635 B1 * | 4/2020 | Carpenter, II | G10L 13/02 |
| 10,818,090 B2 | 10/2020 | Krauthamer | |
| 11,592,667 B2 * | 2/2023 | Fujiwara | G09G 5/10 |
| 2003/0028380 A1 | 2/2003 | Freeland et al. | |
| 2003/0073478 A1 * | 4/2003 | Kovacs | G07F 17/32 |
| | | | 463/16 |
| 2008/0087289 A1 * | 4/2008 | Tanner | A24F 19/105 |
| | | | 131/331 |
| 2009/0106171 A1 | 4/2009 | Hlavac et al. | |
| 2011/0084893 A1 | 4/2011 | Lee et al. | |
| 2012/0262487 A1 | 10/2012 | Huebner | |
| 2013/0300728 A1 * | 11/2013 | Reichow | G09G 3/003 |
| | | | 345/419 |
| 2014/0018150 A1 * | 1/2014 | Wells | G07F 17/3216 |
| | | | 463/31 |
| 2014/0035942 A1 | 2/2014 | Yun et al. | |
| 2014/0118336 A1 * | 5/2014 | Smithwick | G02B 30/27 |
| | | | 345/419 |
| 2014/0333899 A1 | 11/2014 | Smithwick | |
| 2015/0029314 A1 | 1/2015 | Reichow et al. | |
| 2015/0317005 A1 * | 11/2015 | Kim | G06F 3/011 |
| | | | 345/173 |
| 2016/0030835 A1 | 2/2016 | Argiro | |
| 2016/0059145 A1 | 3/2016 | Cortelyou et al. | |
| 2016/0070356 A1 * | 3/2016 | Aguirre | G06F 3/011 |
| | | | 345/156 |
| 2016/0104343 A1 * | 4/2016 | Pellegrini | G07F 17/3244 |
| | | | 463/31 |
| 2016/0117962 A1 * | 4/2016 | Jung | G09G 3/20 |
| | | | 345/156 |
| 2016/0328604 A1 | 11/2016 | Bulzacki | |
| 2017/0041598 A1 | 2/2017 | Smithwick | |
| 2017/0309215 A1 * | 10/2017 | Perdices-Gonzalez | G09G 3/32 |
| 2018/0117465 A1 * | 5/2018 | Voris | A63F 13/26 |
| 2018/0158385 A1 | 6/2018 | Reichow et al. | |
| 2018/0374453 A1 | 12/2018 | Verble | |
| 2020/0150448 A1 | 5/2020 | Smithwick et al. | |
| 2021/0018885 A1 * | 1/2021 | Zimmerman | B05B 17/08 |
| 2022/0248772 A1 * | 8/2022 | Kim | A24F 40/65 |
| 2023/0241472 A1 * | 8/2023 | Gunn | A63B 71/0622 |
| | | | 473/163 |

* cited by examiner

INTERACTIVE DISPLAY WITH SPECIAL EFFECTS ASSEMBLY

CROSS-REFERENCE TO RELATED APPLICATIONS

This application claims priority to and the benefit of U.S. patent application Ser. No. 17/488,058, entitled "INTERACTIVE DISPLAY WITH SPECIAL EFFECTS ASSEMBLY" filed on Sep. 28, 2021, and U.S. Provisional Application No. 63/085,275, entitled "INTERACTIVE DISPLAY WITH SPECIAL EFFECTS ASSEMBLY" filed on Sep. 30, 2020, the disclosures of which are incorporated by reference in their entirety herein.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to amusement park attractions, and more specifically, to providing realistic and/or immersive viewing experiences in amusement park attractions.

Amusement parks or theme parks may include various entertainment attractions for providing enjoyment to guests of the amusement parks. For example, the attractions may include themed environments established using devices displaying media content (e.g., images, special effects, or a combination thereof). For some applications, it may be desirable to display media content with special effects to create an interactive experience for an audience that appears more realistic and to provide a more immersive experience for the guest.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a three-dimensional display system includes a first display and a second display spaced apart from the first display having one or more light source configured to emit light and to illuminate the first display, where the first display is at least partially transparent such that the second display is visible through the first display. The three-dimensional display system includes a special effect system disposed at least in part between the first display and the second display and is configured to be activated to cause a special effect to be visible through the first display. The three-dimensional imaging display system includes a controller communicatively coupled to the first display, the second display, and the special effect system.

In a second embodiment, a three-dimensional system includes a first display that is at least partially transparent, a second display having one or more light sources configured to emit light and to illuminate the first display, a special effect system disposed between the first display and the second display, a plurality of sensors configured to generate one or more sensor signals indicative of a presence of a user, and a controller. The controller is configured to activate the special effect system based in part on the sensor signals generated by the plurality of sensors.

In a third embodiment, a method of forming a three-dimensional display includes receiving a sensor signal indicative of a presence or proximity of a user. The method includes activating a first display that is at least partially transparent and a second display including one or more light sources based on the sensor signal, where the first display and the second display are spaced apart from one another such that the one or more light sources illuminate the first display when the second display is activated. The method includes activating a special effect system to activate a special effect within a space between the first display and the second display based on the sensor signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Presently disclosed embodiments facilitate an interactive display assembly that includes spaced apart displays and special effects that occur within a space between the displays. A first display closer to a guest is at least partially transparent such that the special effects and the more distant second display are visible through the first display. The display content in conjunction with the special effects are used to create visual depth cues to create a more immersive three-dimensional display. Presently disclosed embodiments describe a first display, a second display spaced apart from the first display and having one or more light sources to emit light and illuminate the first display, and a special effect system that operates a special effect between the first display and the second display. The special effect system activates a special effect that is visible through the first display. Additionally, the first display displays its own first display content while the second display displays second display content, which is also visible through the first display.

The presently disclosed embodiments utilize these visual depth cues as well as the three-dimensional special effects of the special effect system to enhance the attraction. The special effect system operates to activate or move special effect components which can include mechanized props (e.g., a character, a set prop), scenery (e.g., mountain, beach, grass), animatronics, and/or special effects materials, such as pyrotechnics and atmospheric effects via physical wind, rain, fog, hail, sleet, snow, lightning, clouds, and so forth. Further, the three-dimensional display system may receive guest feedback and provide an interactive experience to provide spoken interactions, atmospheric effects, leverage one or more haptic effects in order to impart a feeling of a real world physical effect on the guest, actuate one or more of the mechanized props toward the guest, and so forth.

Figure 1:
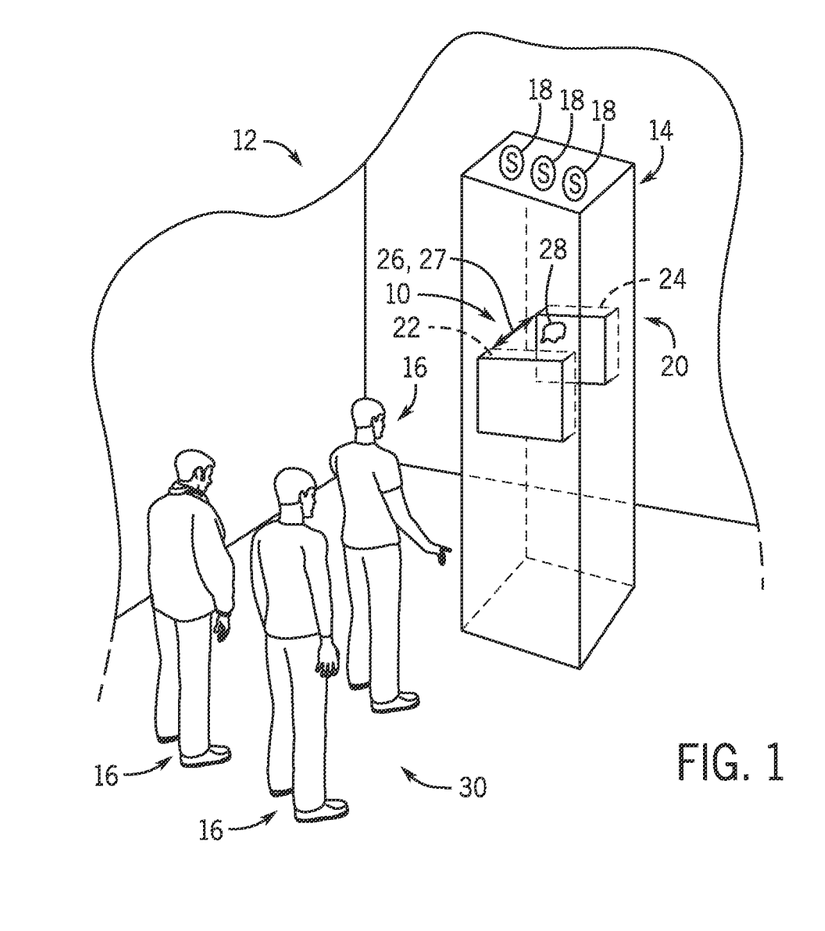
FIG. 1 is a perspective view of an embodiment of a three-dimensional display system that provides interactive viewing experiences to one or more audiences, in accordance with present embodiments.

While present embodiments may be implemented in a variety of settings, an example setting in which a three dimensional display system 10 is used in an amusement park 12 is shown schematically in FIG. 1. As illustrated, the amusement park 12 includes the three-dimensional display system 10 in an enclosure 14. As will be discussed below, the three-dimensional display system 10 is configured to display a three-dimensional presentation (e.g., character, motion graphics, special effects, digital content, etc.) with visual depth cues (e.g., parallax, kinetic depth effect, etc.) to one or more guests 16 in front of the enclosure 14. The three-dimensional display system 10 may be at least partially enclosed in an enclosure 14, as shown, which may be incorporated within an attraction area associated with a particular amusement park ride. The enclosure 14 includes one or more sensors 18 disposed along a surface of the enclosure 14 that operate to sense a presence or proximity of the guest 16 and, as a result, cause the three-dimensional display system 10 to activate one or more features as discussed herein.

In one embodiment, a display assembly 20 is disposed within the enclosure and includes at least a first display 22 and a second display 24. The first display 22 may be separated from the second display 24 via a separation distance 26. Alternatively, the display assembly 20 may be in an open environment, where the first display 22 and the second display 24 are not enclosed. In this manner, the one or more sensors 18 may be disposed on another element in the open environment, such as a nearby wall or in the floor. The one or more sensors 18 can include a camera, a proximity sensor, a sound sensor, a motion sensor, a pressure sensor, a temperature sensor, a flex sensor, an infrared sensor, or any other suitable sensor. The displays 22, 24 may, in an embodiment, also include sensors 18, such as microphones, light sensors, IR sensors, and the like.

By positioning the first display 22 (e.g., a transparent organic light-emitting diode) a short distance away from the second display 24 (e.g., the surface of a high resolution television), an illusion of three dimensional space without the use of 3D glasses may be created, while still minimizing an overall footprint of the enclosure 14. In this manner, a digital character may be able to appear spread throughout the enclosure 14, e.g., extending three-dimensionally along an axis 27 between the first display 22 and the second display 24. One or more actuatable objects 29 and/or a special effect material 31 (FIG. 2) may be utilized to create a more immersive experience. The actuatable objects 29 may include mechanized props (e.g., a character, a set prop), scenery (e.g., mountain, beach, grass), and animatronics. The first display 22 and the second display 24 may, in an embodiment, be substantially parallel to one another within the enclosure 14. The first display 22 may be a display implemented on a transparent or mostly transparent or transmissive (e.g., at least 50% transmissive) panel. It should be understood that, during activation of display content on the first display 22, portions of the display with displayed content may dynamically change in their transmissivity based on the displayed content. For example, areas of the first display 22 that are relatively free of displayed content may more transparent than areas with dark display content. However, in an embodiment, during operation of the three-dimensional display system 10, at least a portion of the first display 22 remains transparent or transmissive to permit viewing of the second display 24 as well as any active special effects displayed between the first display 22 and the second display 24. Further, the first display 22 displays its own first display content that is independent or different from second display content from the second display 24. In an embodiment, the three-dimensional display system 10 coordinates display content of the first display 22 and the second display 24 to augment the desired three-dimensional effect. Further, the display content of the first display 22 and the second display 24 may also be controlled to permit viewing of special effects as disclosed herein.

Figure 2:
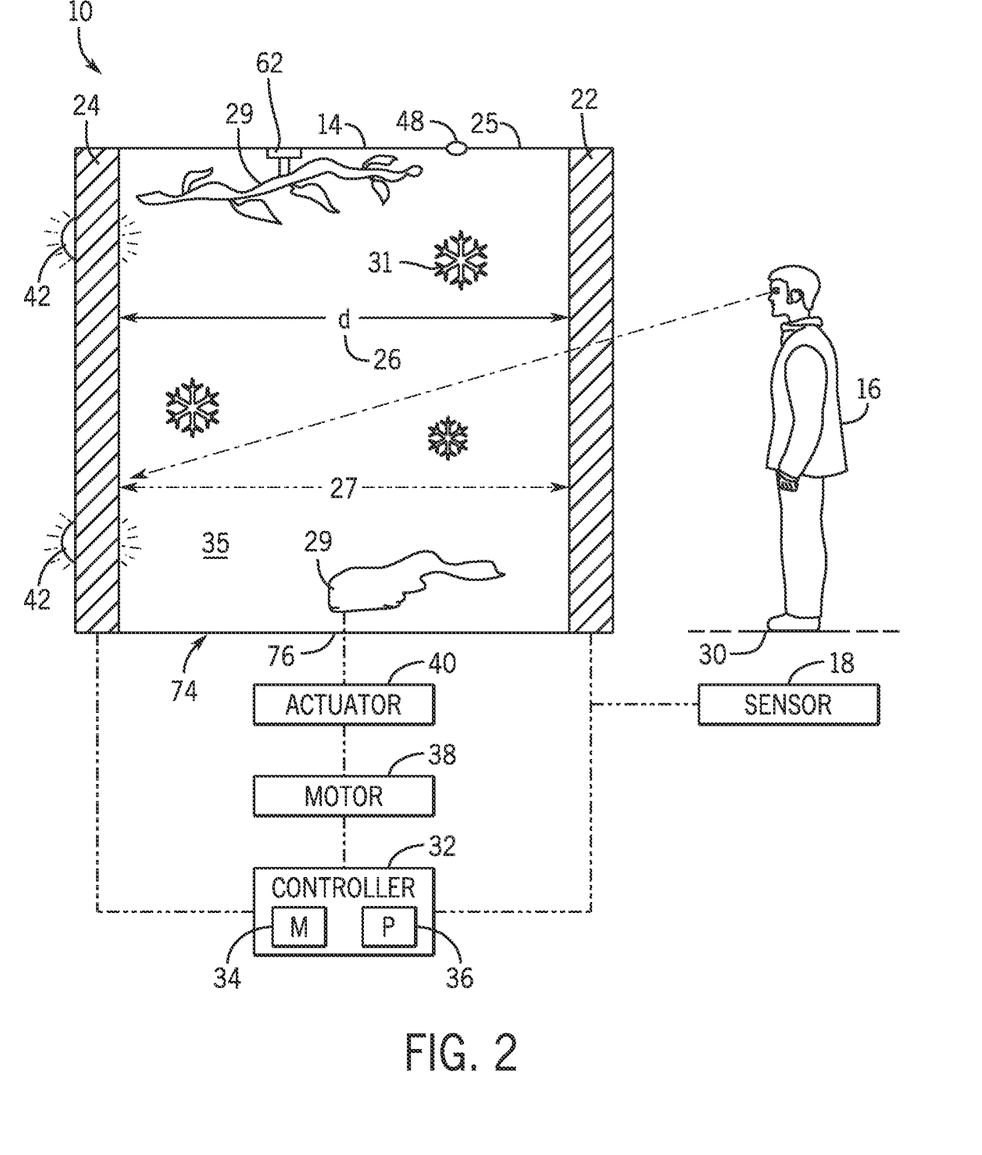
FIG. 2 is a schematic diagram of a side view of an embodiment of the three-dimensional display system of FIG. 1, in accordance with present embodiments.

FIG. 2 is a schematic diagram of a side view of an embodiment of the three-dimensional display system 10 of FIG. 1. In the illustrated embodiment, the guest 16 is able to experience the dynamic viewing experience in the viewing area 30 that is created by the three dimensional display system 10 In the illustrated embodiment, the first display 22 and the second display 24 are disposed on opposite ends of the enclosure 14. The first display 22 is disposed on the end of the enclosure 14 that is closest to the guest 16. The first display 22 may be a transparent display such as a transparent liquid crystal display. The second display 24 is positioned on an opposite end of the enclosure 14 and separated by a space or separation distance 26 as measured along or parallel to the axis 27. The axis 27 may be defined as an axis extending between the first display 22 and the second display 24 and generally orthogonal to the first display 22 and the second display 24. The first display 22, the second display 24, and lateral walls 25 create an enclosed space 35 within which the actuatable object 29 actuates or moves via a motor 38 and/or actuator 40 that is controlled by a special effect system 80 (see FIG. 3) or subcontroller. Additionally or alternatively, a special effect material 31, such as snow as in the illustrated embodiment, may be released into the enclosed space 35. These special effects are visible through the transparent first display 22, which permits viewing of the special effects and the second display 24 by the viewer 16. Thus, the viewer 16 views the display content on the first display 22 and the second display 24 as well as any activated special effects simultaneously as part of the experience.

The first display 22 and the second display 24 may be coupled to a controller 32. The controller 32 may include a memory 34 to store instructions (e.g., software, applications, etc.) and a processor 36 to execute the instructions to control components of the three-dimensional display system 10. The one or more sensors 18 disposed throughout the three dimensional display system 10 may include sensors 18 coupled to the first display 22, the second display 24, the enclosure 14, the one or more actuatable objects 29, one or more motors 38 or actuators 40 coupled to the one or more actuatable objects 29, or in an open environment nearby the display assembly 20 (e.g., a nearby wall or the floor of the viewing area 30). The controller may receive signals from the one or more sensors 18 to control the various components of the three dimensional display system 10, as will be explained in further detail below.

The first display 22 may include includes a transparent light display (e.g., a LCD display or other suitable transparent display). The transparent light display may include one or more graphics, e.g., viewable display content, that are perceived by the guest 16 when standing in the viewing area 30 when the display 22 is illuminated. The second display 24 includes one or more light sources 42 to illuminate the second display 24 and that, in an embodiment, are oriented to emit light towards the first display 22 to at least partially illuminate the first display 22. In an embodiment, the second display 24 may include black, gray, or colored pixels that are used to create one or more graphics. The one or more light sources 42 may be integrated within the second display 24 or may be a separate light source.

When the guest 16 is in the viewing area 30, second display content from the second display 24 is also visible through the first display 22. The guest 16 simultaneously sees first display content from the first display 22 and any active special effects. The one or more special effects contribute to a three-dimension illusion. For example, when the guest 16 is standing in front of the viewing area 30, the one or more actuatable objects 29 may appear to be coming towards the user 16 from the second display 24 to the first display 22, which is located closer to the user 16. Accordingly, the special effect component is actuated to move in a direction towards the user 16. The one or more actuatable objects 29 are coupled to the at least one motor 38 and the at least one actuator 40 in order to move the one or more actuatable objects 29. The one or more actuatable objects 29 are capable of being moved via the motor 38 and the actuator 40. For example, the one or more actuatable objects 29 could be a limb of a robot. Indeed, a particular limb, such as an arm of the robot, could is configured to be actuated towards the user 16 and appear to be emerging through the display assembly 20. The one or more actuatable objects 29 could also be mechanized props (e.g., a character, a set prop), scenery (e.g., mountain, beach, grass). In an embodiment, the actuatable object 29 may be configured as a vine or moss that moves rapidly toward the guest 16 to give the impression that the set of the enclosure 14 is rapidly moving in on the guest 16.

In another embodiment, the special effect in the enclosed space 35 may be a special effects materials 31), such as fog from a fog machine. In this example, the fog machine could be released from an opening or nozzle 48 positioned on or in the lateral wall 25 and emitted towards the guest 16 to effectuate an eerie feeling of the guest 16 walking through a forest or wooded area at night time. The special effect materials 31 may create pyrotechnics and atmospheric effects by creating physical wind, rain, fog, hail, sleet, snow, lightning, clouds, and so forth. In an embodiment, the special effect system 80 may operate to release snow (or confetti resembling snow) as well as air to move the snow within the enclosed space 35.

The enclosure 14 may include rails 62 or guides that may be used to facilitate movement of the actuatable objects 29 within the enclosed space 35. In an embodiment, the actuatable objects may transition from a configuration outside of the enclosed space 35 to inside the enclosed space 35 as part of actuation. In an embodiment, the actuatable objects 29 may be disposed partially or completely outside of the enclosed space 35 when no special effects are active. For example, the actuatable object 29 of the special effect system 80 may be coupled to an outer surface 74 of the lateral wall 25 defining the enclosed space 35. The lateral wall 25 may be part of the enclosure walls or may be inset within the enclosure 14 such that certain mechanical components between the lateral wall 25 and the enclosure walls are hidden from view of the guest. It may be appreciated that when components of the special effect systems 80 are disposed externally to the enclosed space 35, one or more openings 76 may permit access to the enclosed space 35 to receive the actuatable objects 29 and/or the special effect materials 31. In this manner, the actuatable objects 29 or material sources (e.g., reservoirs, fluid tanks) holding special effect materials 31 may be significantly disposed externally to the enclosed space 35 and not directly between the first display 22 and the second display 24. However, the actuatable objects 29 and/or the special effect materials 31 may be observed within the space 26 between the first display 22 and the second display 24. In one example, a smoke cannon may be disposed on or adjacent to the outer surface 74 so that the components are outside the enclosure 14, while the smoke is directed into the enclosure 14 via the nozzle 48 or the opening 76 and observed by the guest 16.

Figure 3:
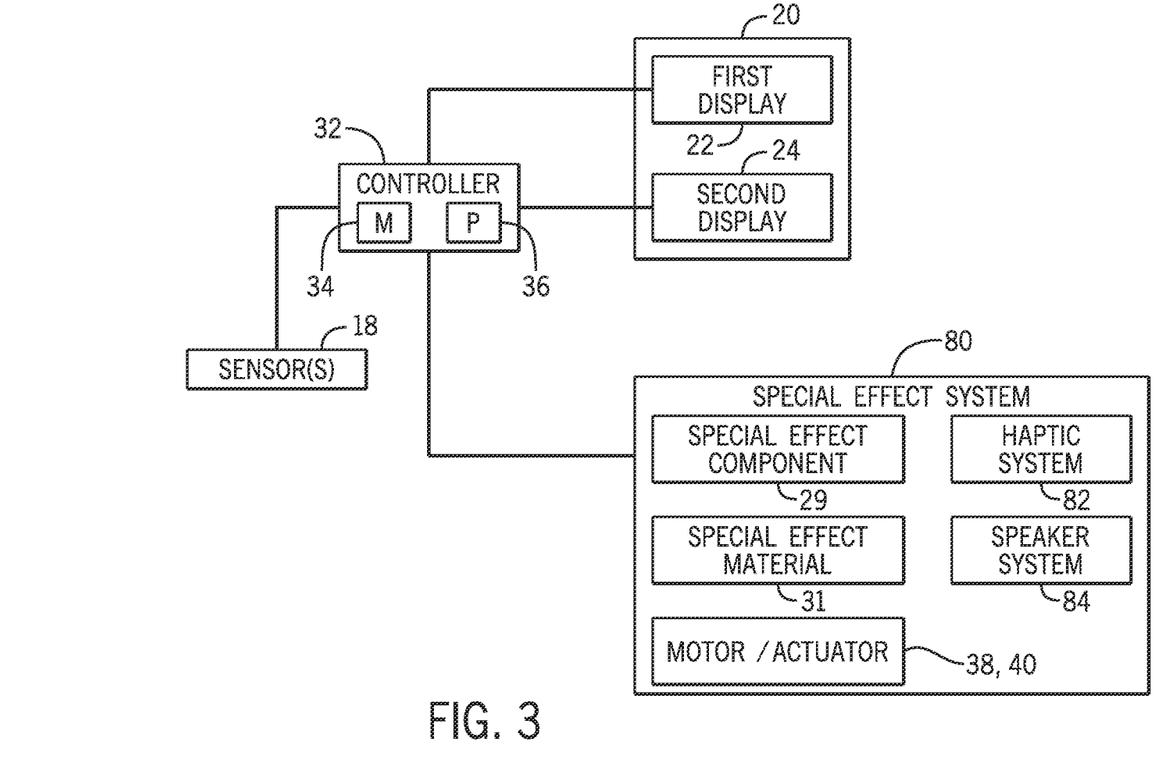
FIG. 3 is a block diagram illustrating components provided by the three-dimensional display system of FIG. 1, in accordance with present embodiments.

FIG. 3 is a block diagram 300 illustrating components provided by the three-dimensional display system 10, in accordance with present embodiments. As depicted the controller 32 is communicatively coupled at least the first display 22, the second display 24, and a special effect system 80 that may include actuatable objects 29 and/or special effect materials 31. The actuatable objects 29 may include audio equipment, lighting effects equipment, motors, actuators, electrical and mechanical components and other components necessary to create the desired special effect. The special effect materials 31 and associated delivery mechanisms may include materials such as gases, liquids, solid materials, containers, dispensers, sprayers, misters, timers, motors, actuators, electrical and mechanical components, and so forth as needed to create the desired special effect from the particular materials (e.g., rain, fog, sleet, hail, ice, snow, smoke, fire, wind, etc.). The special effect system may also include the motor 38 and/or actuator 40, a haptic system 82 that mediates haptic effects, and a speaker system 84 that mediates sound or audio effects.

As discussed above, the three-dimensional display system 10 includes one or more sensors 18. The sensors may output signals indicative of the various components associated with the enclosure 14 as well a presence or location of the guest 16. For example, the sensors 18 coupled to the enclosure 14 may include a camera, a position sensor, a motion sensor, a sound sensor, or any other suitable sensor. In one example, the sensors 18 are disposed to an external surface of the enclosure 14 (e.g., an outer topmost surface) so that the sensors 18 may more readily sense the guest's 16 interactions with the enclosure 14.

The sensors 18 may detect presence, proximity, actions (e.g., motion of the guest 16 via one or more motion sensors), or inputs of the guest 16 to activate one or more features of the three-dimensional display system 10, e.g., to trigger, activate, or move one or more special effect elements 28 via the motor 38 and actuator 40. The detected motion could be a wave, a step, a high-five, hovering a hand over the sensor 18, or any other motion that can be detected by the motion sensors 18. In response to the detected motion, the controller 32 may vary the movement of the actuator 40 by varying the time, speed, angle, or position at which the one or more special effect elements 28 is moved within the first display 22 and the second display 24 within the enclosure 14. Additionally, the controller 32 may adjust the one or more special effect elements 28 relative to one another so that the adjustment of the special effect elements 28 is made at a particular angle relative to another special effect element 28 or other component in the enclosure 14.

It may be appreciated that the foregoing discussion pertaining to the movement of the special effect elements 28 (i.e., the actuatable objects 29 and the special effect materials 31) may be controlled, directed, and/or adjusted by the controller 32. The controller 32 receives sensor signals from the plurality of sensors 18 disposed throughout the three-dimensional display system 10. As discussed above, the sensors 18 may be coupled to the enclosure 14, in an open environment, disposed within the displays 22, 24, or coupled to various components associated with the special effect elements 28. The controller 32 may be activated in response to one or more various sensor signals in order to create a realistic experience for the guest 16. In one example, the sensors 18 are configured to generate signals representative of the guest's 16 movement. The signals can indicate presence of the guest 16, position of the guest 16, or movement of a particular limb or body part of the guest 16 (e.g., skeletal tracking). The controller 32 may receive one or more of these signals to control one or more components of the three-dimensional display system 10 in order to activate one of the mechanized props, create a change in scenery, create atmospheric effects, and so forth. For example, when the guest 16 moves towards the enclosure 14, the mechanized prop (e.g., a character) may be moved towards the guest 16 so that both the guest 16 and the character within the enclosure 14 appear to be moving towards each other. The controller 32 may also adjust the time, speed, angle, or position at which the one or more special effect elements 28 is activated.

In one example, the sensor 18 may be used to identify an object, activate skeletal tracking, or identify a face of guests to determine if the guest has been at the enclosure 14 before. In one embodiment, if the guest has visited the enclosure 14 before, the controller 32 may be configured to provide a different experience to the guest 16 by activating or selecting a different (new) effect controlled by the special effect systems 80, changing an effect (e.g., play different or scary music, flash bright lights in a manner to emulate lighting or a lighting pattern experienced in an attraction such as a haunted house, etc.), or otherwise activating a different visual effect (e.g., a cracked glass effect) in order to provide the different experience. Additionally, if the sensor 18 determines that another guest 16 has joined the first guest 16, the display assembly 20 may be configured to emit a different visual effect, change the effect associated with the one or more special effect systems 80, and so forth in order to change the settings of the enclosure 14 based on the additional number of guests 16.

The sensor 18 may also be a microphone or noise sensor configured to detect sound of the guest 16 or the surrounding environment. For example, the sensor 18 may pick up sound from the surrounding environment. The controller 32 can then adjust the sound of the components of the enclosure 14 if the overall sound of the immersive experience of the three dimensional display system 10 needs to be increased in order to be loud enough to be heard by the guest 16 over the sound of the surrounding environment. In another example, the sensor 18 may pick up the sound of another guest 16 approaching the enclosure 14. The controller 32 may then adjust the immersive experience of the enclosure 14 as discussed above in order to provide a different experience (e.g., emit a different visual effect, change the effect associated with the special effect system 80, and so forth). In some embodiments, the three dimensional display system 10 may use an artificial intelligence application in order to interact with the guest 16. A pre-recorded sound bite, message, or other animation may be played by the speaker system 84 in response to a particular signal output by the sound sensor 18. For example, when the guest 16 approaches the enclosure 14 and exclaims "Look at this creepy critter!", a pre-recorded message may be played back to the guest 16 to interact with the guest 16. To achieve the desired effect, a voice font can be produced from words previously recorded by an actor or another source in order to provide different phrases, sentences, or snippets to be played to the guest 16.

In another example, the sensors 18 may create signals that are representative of objects, faces, voices, sounds, voice content, and so forth. The controller 32 may adjust the operation of the special effect system 80 in response to these signals. For example, the controller 32 may use speech recognition, language processing, artificial intelligence, and/or voice font in order to speak to the guest 16. In some embodiments, a voice font can be produced from a set of utterances previously recorded by an actor or another source in order to provide different phrases, sentences, or snippets to be played to the guest 16. In another example, the controller 32 may activate the special effect systems 80 in order to leverage one or more haptic effects of the haptic system 82 in order to impart a feeling of a real world physical effect on the guest 16, such as use of an air nozzle, ultra-sonic transducers, and so forth.

Figure 4:
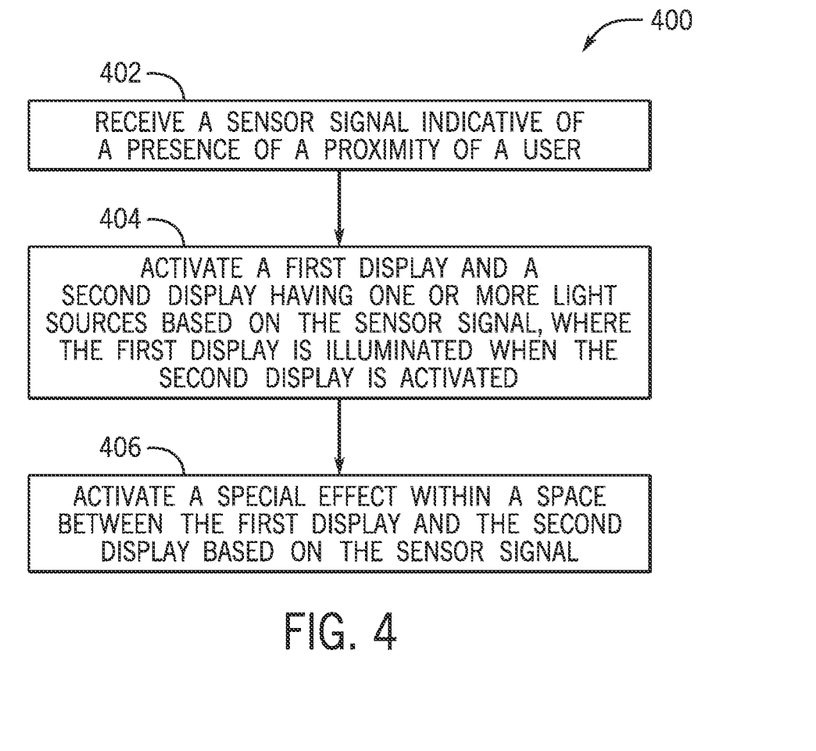
FIG. 4 is a flow diagram illustrating an embodiment of a process of operating the three-dimensional display system of FIG. 1, in accordance with present embodiments.

FIG. 4 is a flow diagram illustrating an embodiment of a process 400 of operating the three-dimensional display system 10 of FIG. 1, in accordance with present embodiments. The process 400 may include receiving (block 402) a sensor signal from one or more sensors 18 that is indicative of a presence or proximity of a user. As discussed above, the sensors 18 may include a camera, a proximity sensor, a sound sensor, a motion sensor, a pressure sensor, a temperature sensor, a flex sensor, an infrared sensor, a light sensor, a microphone, or a combination of these sensors. For example, the sensors 18 may detect the presence of the guest 16 into the viewing area 30, that another guest 16 has entered the viewing area 30, sound, motion, and so forth.

The process 400 may include activating (block 404) the first display 22, the first display 22 being at least partially transparent and the second display 24, the second display having the one or more light sources 42, based on the sensor signal. When the first display 22 is activated, the first display 22 may display its content. The images displayed on the first display 22 (nearest to the guest 16) appear closer than the images displayed on the second display 24. The images displayed on the first display 22 may be different images that give the appearance of two scenes (e.g., a mountain in the background and a gnome in the foreground). Alternatively, the images displayed on the first display 22 and the second display 24 may be perceived as part of one overall image, where separate elements of the overall image are shown on the first display 22 (e.g., first display 22 showing a nose) and the second display 24 (e.g., second display 24 showing remaining facial features, such as eyes and mouth) to create a digital character with greater depth effects.

The process 400 may include activating (block 406) the special effect system 80 to activate a special effect element 28 within the enclosed space 35 between the first display 22 and the second display 24 in response to the signal(s) from the sensors 18. As discussed above, the special effect may include special effects such as actuation of a prop, or utilizing special effect materials such as fire, smoke, fog, rain, and so forth. In an embodiment, the display content of the first display 22 may be selected to augment the special effect. In one example, the display content may be absent in an area of the first display 22 corresponding to the actuatable object 29 to permit viewing of the actuatable object 29 through the transparent, and empty, area of the display. In another example the display content may be layered with the actuation such that the actuatable object 29, implemented as a vine moving towards the first display 22, is simultaneous with display content showing expanding or spreading leaves.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A three-dimensional display system, comprising:
one or more first displays that are at least partially transparent;
a second display comprising one or more light sources configured to emit light and to illuminate at least one of the one or more first displays;
one or more special effect systems configured to release one or more special effect materials between the one or more first displays and the second display;
one or more sensors configured to generate one or more sensor signals indicative of a presence of a user; and
one or more controllers configured to activate the at least one of the one or more special effect systems based in part on at least one of the one or more sensor signals generated by at least one of the one or more sensors to cause at least one of the one or more special effect systems to release at least one of the one or more special effect materials.

2. The three-dimensional display system of claim 1, wherein at least one of the one or more controllers is configured to identify the user based on the at least one of the one or more sensor signals and to select one or more special effects of at least one of the one or more special effect systems based on the identified user.

3. The three-dimensional display system of claim 2, wherein the at least one of the one or more controllers is configured to perform facial recognition to identify the user as being a repeat visitor.

4. The three-dimensional display system of claim 3, wherein the at least one of the one or more controllers is configured to select at least one of the one or more special effects of the at least one of the one or more special effect systems based on the identified user being the repeat visitor such that the selected at least one of the one or more effects is a different effect relative to a previous visit of the user.

5. The three-dimensional display system of claim 1, wherein at least one of the one or more controllers is configured to identify the user and additional users based on the at least one of the one or more sensor signals and to select one or more effects of at least one of the one or more special effect systems based on the identified user and the additional users.

6. The three-dimensional display system of claim 5, wherein the at least one of the one or more controllers is configured to select the at least one of the one or more effects of the one or more special effect systems based on a number of the additional users.

7. The three-dimensional display system of claim 1, wherein the one or more sensors comprises a camera, a noise sensor, or a position sensor.

8. The three-dimensional display system of claim 1, wherein at least one of the one or more controllers is configured to adjust a speed, timing, angle, or position of the release of the at least one of the one or more special effect materials of the one or more special effect systems based in part on the at least one of the one or more sensor signals.

9. The three-dimensional display system of claim 1, wherein the at least one of the one or more special effect materials comprises one or more of a smoke, fog, rain, or snow effect.

10. The three-dimensional display system of claim 1, wherein the at least one of the one or more special effect materials is released from a reservoir.

11. A special effects method, comprising:
receiving one or more sensor signals from one or more sensors, at least one of the one or more sensor signals being indicative of a presence and/or proximity of a user;
activating one or more first displays, the one or more first displays being at least partially transparent;
activating a second display, the second display comprising one or more light sources, wherein at least one of the one or more first displays and the second display are spaced apart from one another such that the one or more light sources illuminate the at least one of the one or more first displays when the second display is activated; and
controlling one or more actuatable elements comprising a mechanical prop to move between the one or more first displays and the second display based on the at least one of the one or more sensor signals.

12. The method of claim 11, comprising releasing one or more special effect materials based on the at least one of the one or more sensor signals.

13. The method of claim 12, wherein at least one of the one or more special effect materials is released into one or more spaces between the at least one of the one or more first displays and the second display.

14. The method of claim 11, wherein activating at least one of the one or more actuatable elements comprises adjusting one or more distances between the at least one of the one or more actuatable elements and the at least one of the one or more first displays.

15. The method of claim 14, comprising controlling one or more speeds at which the one or more distances between the at least one of the one or more actuatable elements and the at least one of the one or more first displays are adjusted.

16. The method of claim 11, wherein actuation of at least one of the one or more actuatable elements comprises activation of one or more motors.

17. The method of claim 11, comprising determining a location of the user based on the at least one of the one or more sensor signals.

18. The method of claim 11, comprising identifying the user based on the at least one of the one or more sensor signals and activating one or more special effects and/or changing one or more actuation characteristics of at least one of the one or more actuatable elements based on the identification.

19. The method of claim 18, wherein the identifying comprises facial recognition.

20. The method of claim 11, comprising adjusting an orientation, an angle, or a position of at least one of the one or more actuatable elements based on the at least one of the one or more sensor signals.

21. The method of claim 11, wherein the mechanical prop comprises an actuator.

* * * * *